Patented Sept. 17, 1929

1,728,583

UNITED STATES PATENT OFFICE

ERNEST H. WIEGAND AND DELOSS E. BULLIS, OF CORVALLIS, OREGON, ASSIGNORS, BY MESNE ASSIGNMENTS, TO THE CITIZENS OF THE UNITED STATES

PROCESS FOR THE GRADING OF FRESH OR DRY FRUITS

No Drawing.  Application filed December 11, 1928.  Serial No. 325,351.

(GRANTED UNDER THE ACT OF MARCH 3, 1883, AS AMENDED APRIL 30, 1928; 370 O. G. 757)

This application is made under the act approved April 30, 1928, and the invention herein described, may be manufactured and used by or for the Government for governmental purposes, without payment to us of any royalty thereon.

This invention relates to the use of certain products for producing a solution of greater density than water for separating fresh or dried fruits into their respective quality grades, depending upon density or maturity.

The products in question are: sucrose, glucose, levulose, maltose, sodium chloride, calcium chloride, molasses, fruit juices, or any other saccharide.

The invention is made effective by floating out the light from the heavier fruits in solutions of various densities. For most purposes these densities will approximate the density of the juice of the fruits being separated. Any number of separations can be made by immersing the fruits in solutions of various densities.

The process of separating is simple the fruit being immersed in a solution approximating the density of the juice. The green fruit will float on the surface and can be removed by dipping off with a ladle, the riper fruit will sink to the bottom. The fruit thus sinking is then subjected to a solution of a density approximately 10 degrees heavier and the separation of the mature from the less mature will again occur by the heavier more mature fruit sinking and the lighter immature fruit floating. Four or five separations can be made by starting as is indicated with Italian prunes at 30° then 40°, 50° and 60° solutions (salometer). Italian prunes subjected to the following solutions gave the results indicated in the table below.

| Solution density | Fruit juice density (Balling hydrometer) |
|---|---|
| 40 degree (salometer) salt | Floating fruit 22.4% soluble solids |
| 50 degree (salometer) salt | Floating fruit 23.2% soluble solids |
| 60 degree (salometer) salt | Floating fruit 26.0% soluble solids |
| 60 degree (salometer) salt | Sinking fruit 34.0% soluble solids |

In each of the above cases the results indicate the increased maturity by the increased percentage of solids in solution. The fruit in this case was first immersed in a 40 degree (salometer) salt solution. The fruit floating to the surface was tested by extracting the juice. This juice tested for soluble solids with a Balling hydrometer indicated 22.4%. The fruit sinking to the bottom of the tank was immersed in a second tank containing a solution of salt of 50 degree density (salometer). The fruit floating in this solution was slightly more mature as indicated by the Balling hydrometer when the juice was tested, showing 23.2% soluble solids. The fruit sinking in the 50 degree solution was then immersed in a 60 degree (salometer) salt solution. The fruit floating in this solution was more mature than the fruit floating in 50 degree salt solution as was indicated by the density of the juice of the fruit which indicated 26% solids in solution. The fruit sinking in the 60 degree salt solution was the most mature and the juice of the fruit indicated a density of 34% solids in solution. It can be seen from the above that the gradual increase in soluble solids and increase in weight of fruit as was evidenced by its sinking in the more dense solutions indicates its increasing maturity. The fruit thus separated indicated by appearance its increase in maturity by softer texture, change in flesh color and increase in color of the skin.

The term sugar as here used is intended to include in addition to cane sugar, other suitable forms of carbohydrates such as other sugars (glucose, etc.) alone and mixtures such as corn syrups.

We claim:

A process for the grading of substantially perfect fruit which varies in specific gravity depending on degree of maturity, consisting in delivering the fruit to a bath of a liquid having a density adjusted to be intermediate that of the juice of the mature fruit and of the juice of the less mature fruit, and permitting the most mature fruit to sink and the immature fruit to float.

ERNEST H. WIEGAND.
DELOSS E. BULLIS.